United States Patent [19]

Buchner et al.

[11] Patent Number: 5,445,870
[45] Date of Patent: Aug. 29, 1995

[54] METHOD OF PRODUCING OVERPRESSURE VALVE FOR PACKAGING CONTAINERS

[75] Inventors: Norbert Buchner, Winnenden; Klaus Domke, Ditzingen; Manfred Reichert, Remshalden; Herbert Stotkiewitz, Bietigheim-Bissingen; Bernd Wilke, Leutenbach; Sabine Zimmermann, Kornwestheim; Kuno Lemke, Bietigheim-Bissingen; Guenther Voegele, Schoenaich, all of Germany

[73] Assignee: Robert Bosch GmbH, Stuttgart, Germany

[21] Appl. No.: 295,192

[22] Filed: Aug. 24, 1994

Related U.S. Application Data

[62] Division of Ser. No. 130,493, Oct. 1, 1993.

[30] Foreign Application Priority Data

Dec. 18, 1992 [DE] Germany .................. 42 43 020.8

[51] Int. Cl.6 ............................................ B32B 9/00
[52] U.S. Cl. .................................. 428/214; 428/105; 428/131; 428/137; 428/192; 428/193; 428/194; 383/102; 383/103; 220/359; 137/516.11; 137/859
[58] Field of Search ............. 428/192, 195, 193, 194, 428/214, 105, 131, 137; 137/246, 550, 516.11, 856, 859; 383/102, 103; 220/359

[56] References Cited

U.S. PATENT DOCUMENTS 4,653,661  3/1987  Buchner et al. ............... 220/209
5,263,777  11/1993  Domke .......................... 383/103

FOREIGN PATENT DOCUMENTS 0043425  5/1984  European Pat. Off. .
2931850  2/1981  Germany .

Primary Examiner—Patrick J. Ryan
Assistant Examiner—Abraham Bahta
Attorney, Agent, or Firm—Edwin E. Greigg; Ronald E. Greigg

[57] ABSTRACT

A method of producing overpressure valves for packaging containers supplied in a roll, transported in this form to a packaging machine, separated at the machine and attached to packaging containers by means of an adhesive coated surface. For this purpose the overpressure valves have a layer of emulsion bonding on their underside. To prevent individual layers of the roll from sticking together, the overpressure valves have an adhesive-repelling layer on their top side. The overpressure valves are connected to one another in one piece and in a row, and are separated consecutively in a packaging machine.

4 Claims, 3 Drawing Sheets

5,445,870

METHOD OF PRODUCING OVERPRESSURE VALVE FOR PACKAGING CONTAINERS

This is a divisional of copending application Ser. No. 08/130,493, filed on Oct. 1, 1993, now pending.

BACKGROUND OF THE INVENTION

The invention is based on an overpressure valve for packaging containers as defined hereinafter. An overpressure valve of this type and its method of production are known from German Patent Publication DE-A 29 31 850. The overpressure valves, which are circular in contour, are detachably glued on a backing strip. The disadvantage of this is the large amount of waste produced when the overpressure valves are punched out of the composite strip. Moreover, a backing strip that additionally increases production costs is necessary for handling or transporting the overpressure valves. Further, a device for attaching overpressure valves to packaging containers is known from European Patent Disclosure EP-A 0 043 425, with which the overpressure valves supplied on a supply roll and glued to the backing strip are detached individually from the backing strip and attached to the packaging container by their adhesive-coated underside. The disadvantage of this is that the backing strips must be collected separately and disposed of.

OBJECT AND SUMMARY OF THE INVENTION

In contrast, the overpressure valve of the invention, has the advantage that, because of the adhesive-repelling top surface of the spacing strips, the overpressure valves can be rolled up in the form of an endless row without the danger of their sticking together, and without the use of a special backing strip. The overpressure valves are supplied to the packaging containers in that they are separated individually from the roll in the packaging machine and transported. It is particularly advantageous when the contours of the overpressure valves are rectangular or hexagonal, so that they can be disposed directly next to one another in the composite strip, by means of which the quantity of waste created during separation of the overpressure valves from the composite strip is minimized, particularly with the rectangular embodiment.

Improvements of the overpressure valve disclosed are possible by means of the further developments; outlined hereinafter.

The overpressure valve can be particularly easily produced, handled and stored.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
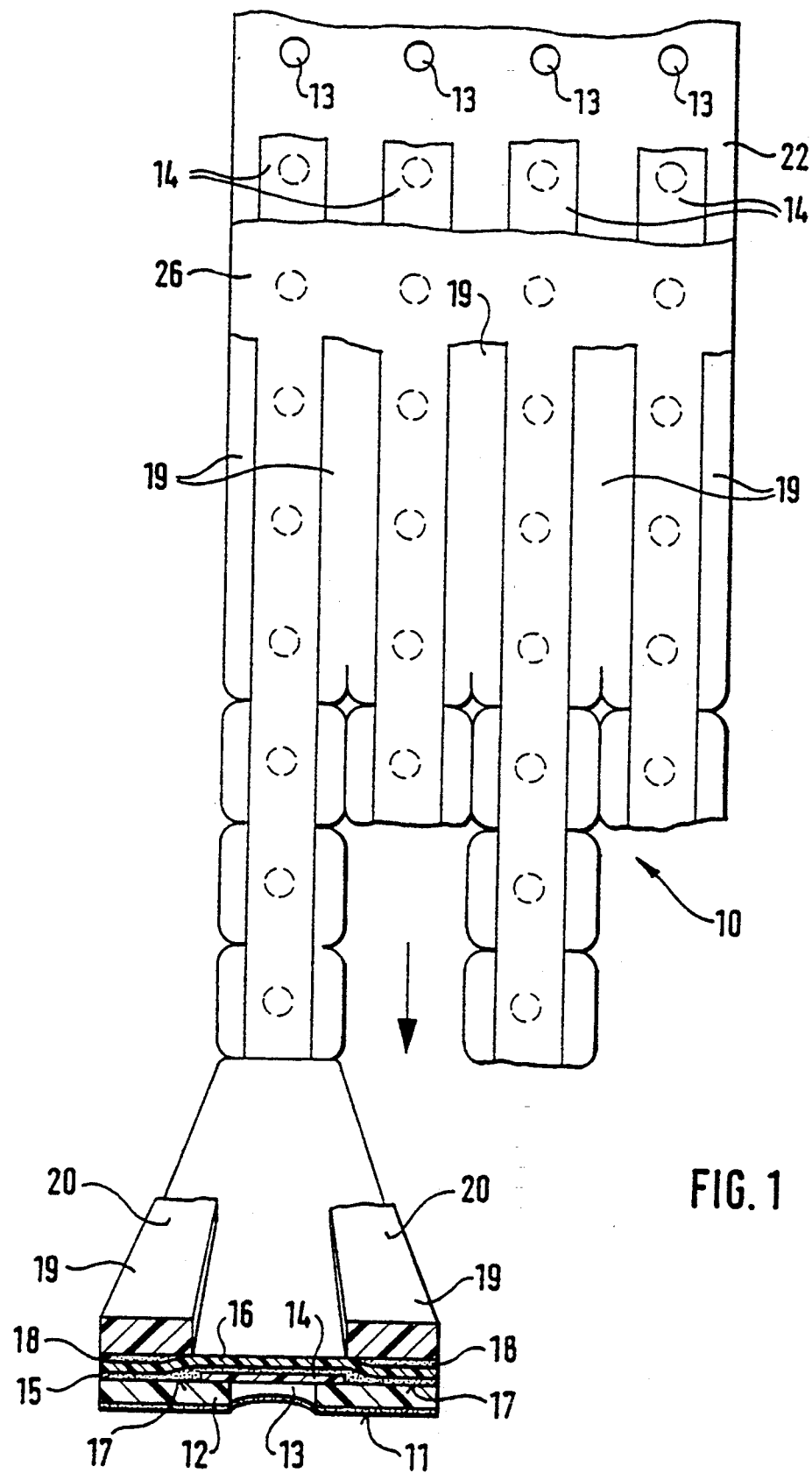
FIG. 1 schematically shows the manufacturing process of overpressure valves.

An overpressure valve 10 for packaging containers, such as for coffee, shown in FIG. 1, has a base 12 coated on the underside with adhesive 11 and a hole 13, through which the overpressure present in the packaging container can escape. The base 12 has in particular a thickness of 150 μm to 250 μm. A valve strip 14, which does not include an adhesive on either side and having a thickness of 5 μm to 35 μm, covers the hole 13 in the base 12 and is secured on a layer 15 of adhesive on the underside of a diaphragm 16, leaving two adhesive strips 17 free on the edge side. The diaphragm 16, which completely covers the base 12 and is secured to it by the two adhesive strips 17, has a thickness of 5 μm to 35 μm. The base 12, the valve strips 14 and the diaphragm 16 in this case comprise a material with one and the same temperature of expansion coefficients, particularly polyester. Moreover, the valve strips 14 and the diaphragm 16 can be coated with a barrier layer of silicon oxide, aluminum oxide or the like, for example. The valve strip 14 can be omitted when only two parallel adhesive strips 17 are applied to the edge side of the diaphragm 16 that leave free a strip-shaped central valve zone. Two spacing strips 19, which are provided on the underside with a layer 18 of adhesive and leave the valve strip 14 or the valve zone free, are fixed on the diaphragm 16 and coincide with the two adhesive strips 17 of the diaphragm 16. The spacing strips 19 consist of polyester, polyethylene, Teflon, silicon cardboard or polypropylene, for example, and have in particular a thickness of 150 μm to 500 μm. Their free top sides 20, whose surface can be grained, are made to be adhesive repelling by means of the application of a thin layer of silicon or Teflon. The adhesive used to construct the overpressure valves 10, 10a is a non-hardening bonding emulsion, preferably on a polyurethane base.

Figure 2:
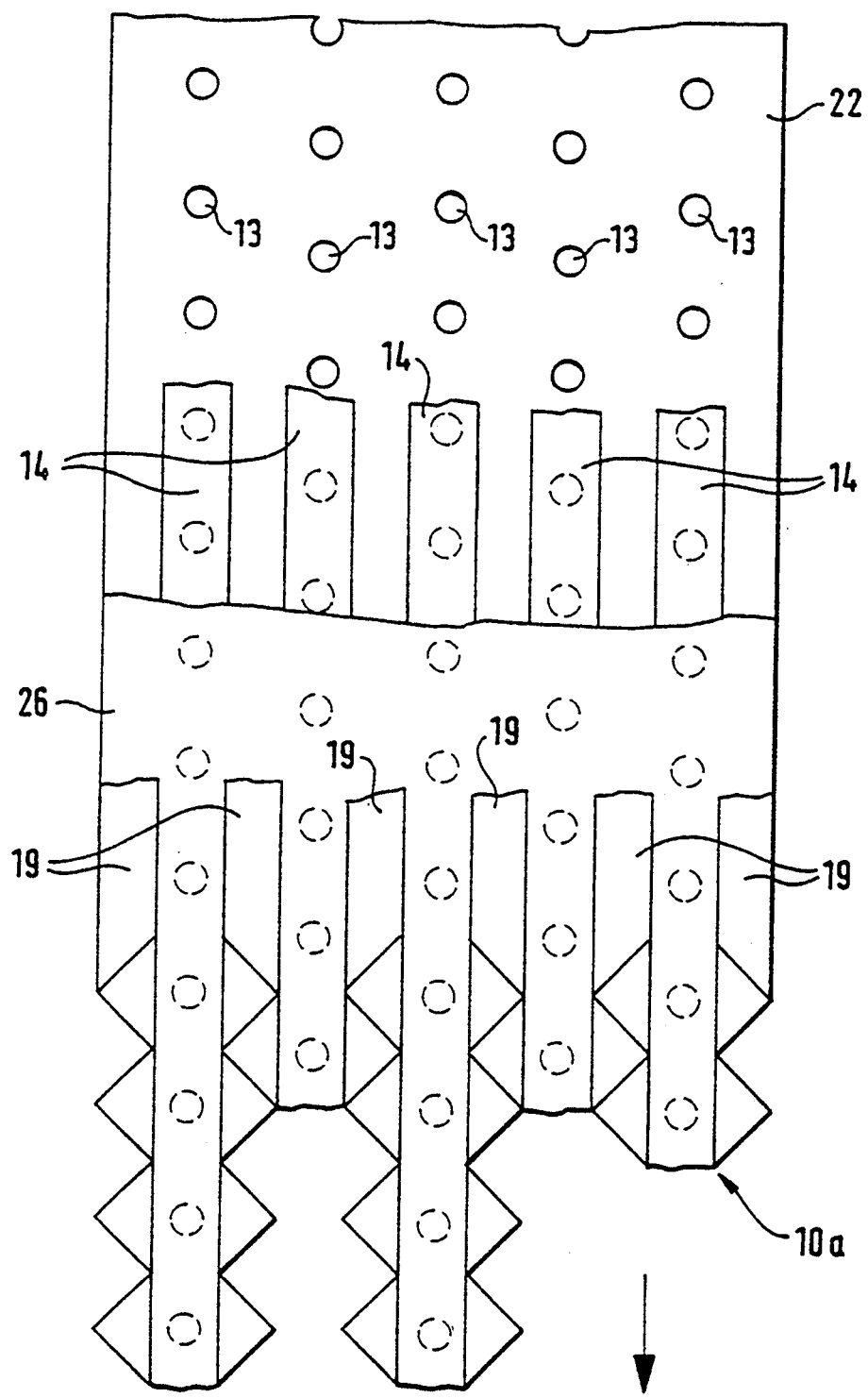
FIG. 2 shows the manufacturing process, in a modified form of overpressure valves, as compared to FIG. 1.
Figure 3:
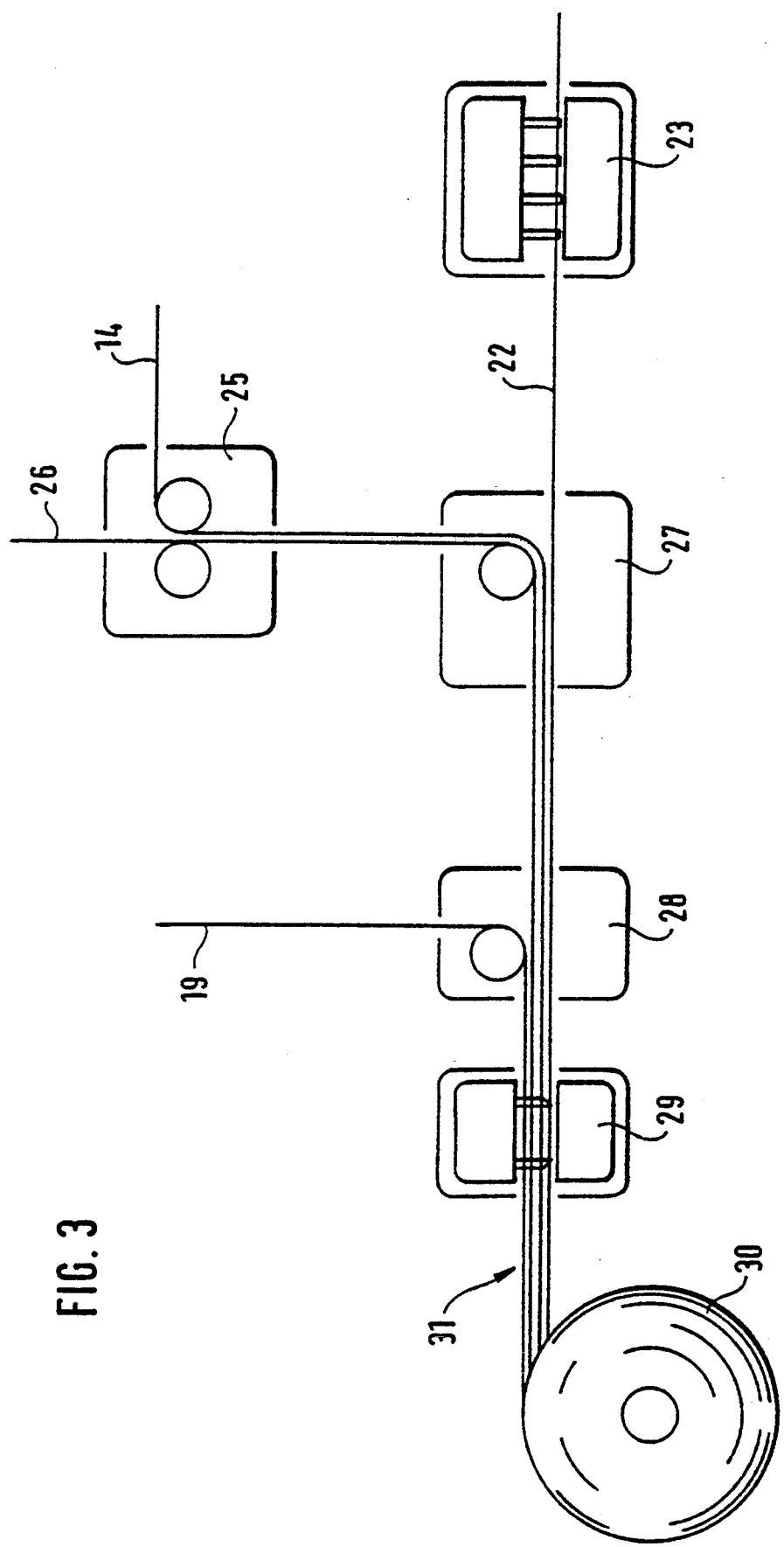
FIG. 3 shows an installation for manufacturing overpressure valves.

The above-described overpressure valves 10, 10a are produced in an installation shown in FIG. 3. In a station 23 in this installation, the holes 13 are continuously punched at uniform spacings into an incoming base strip 22 coated on the underside with adhesive. During this a valve strip 14, which is not adhesive on either side, and a diaphragm strip 26, which is provided on the underside with an adhesive layer 15, are connected to one another through rolling in a station 25, for example. The station 25 is omitted in an embodiment of the overpressure valves 10, 10a, which have no separate valve strips. In this case only the parallel adhesive strips 17 on the edges that leave free valve zones are disposed on the underside of the diaphragm strip 26. Subsequently, in a station 27 the diaphragm strip 26 is applied coincidingly with the valve strip 14 onto the base strip 22. Then the spacing strips 19, coated on the underside with adhesive and coinciding with the adhesive strips 17 of the diaphragm strip 26, are applied. In the exemplary embodiments shown, a composite strip 31 is produced by means of the above-described method to have a plurality of adjacent rows of overpressure valves 10, 10a, such as four or five rows. The composite web formed in this manner then passes through a station 29 in which overpressure valves 10, 10a connected to each other in one piece and in at least one row, are punched out of the composite web. This process results in an especially low material consumption when, as shown in FIG. 1, the contours of the overpressure valves 10 are rectangular. However, even when the overpressure valves 10a have a hexagonal contour, as in FIG. 2, a lower material consumption results in comparison to a round contour, for example, because waste only accumulates in the two edge regions of the composite web. In a final step, the rows of overpressure valves 10, 10a produced in this manner are wound to form a roll 30. In the process the base strip 22 rests with its underside coated with adhesive 11 on the adhesive-repelling top side of the spacing strips 19. The overpressure valves 10, 10a produced and stored in the form of rolls 30 are transported to a packaging container and further processed in it, in that they are separated individually from the roll 30 and attached to a packaging container via a degassing hole.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for producing overpressure valves as a composite web (31) and rolling said web into a roll including at least one row of overpressure valves, which comprises directing a base strip (22) through a punching station with said base strip being coated on an underside with an adhesive (11), continuously punching at least one equally spaced row of holes along a length of said base strip, applying an adhesive onto an underside of a diaphragm strip (26) with the adhesive forming at least spaced parallel rows of adhesive strips (17) onto the lower surface of said diaphragm strip, applying the diaphragm strip (26) having said parallel rows of adhesive strips (17) onto said base strip thereby covering the at least one row of holes and with said parallel adhesive strips (17) along opposite edges of said linearly spaced holes, applying spaced strips (19) provided on the underside with adhesive (18) to the diaphragm strip (26) with each spaced strip (19) coinciding with the rows of adhesive strips (17) on the lower surface of said diaphragm strip, forming the top side (20) of the spacing strips (19) with an adhesive-repelling surface; punching out separately formed overpressure valves of said at least one row which are secured to each other in one piece, rolling said at least one separate row of overpressure valves formed from said composite web (31) to form at least one rolls (30) with the underside of the base strip (22) of each roll that is coated with adhesive (11) directly on the adhesive-repelling top side (20) of the spacing strips (19) with the overpressure valves (10, 10a) connected to one another in one piece and in at least one row.

2. The method as defined by claim 1, in which the diaphragm strip (26) is coated on the entire underside with adhesive (15), and that the center zone between the adhesive strips (17) is covered by a valve strip (14) that is free of adhesive on each side.

3. The method as defined by claim 1, in which overpressure valves (10, 10a) are separated consecutively from the composite web (31) in at least one row.

4. A method as set forth in claim 1, in which the overpressure valves (10, 10a) are plate shaped and the base strip (22) rests with its adhesive-coated underside against the adhesive-repelling top side (20) of the spacing strips (19) in the roll (30).

* * * * *